United States Patent Office 3,152,982
Patented Oct. 13, 1964

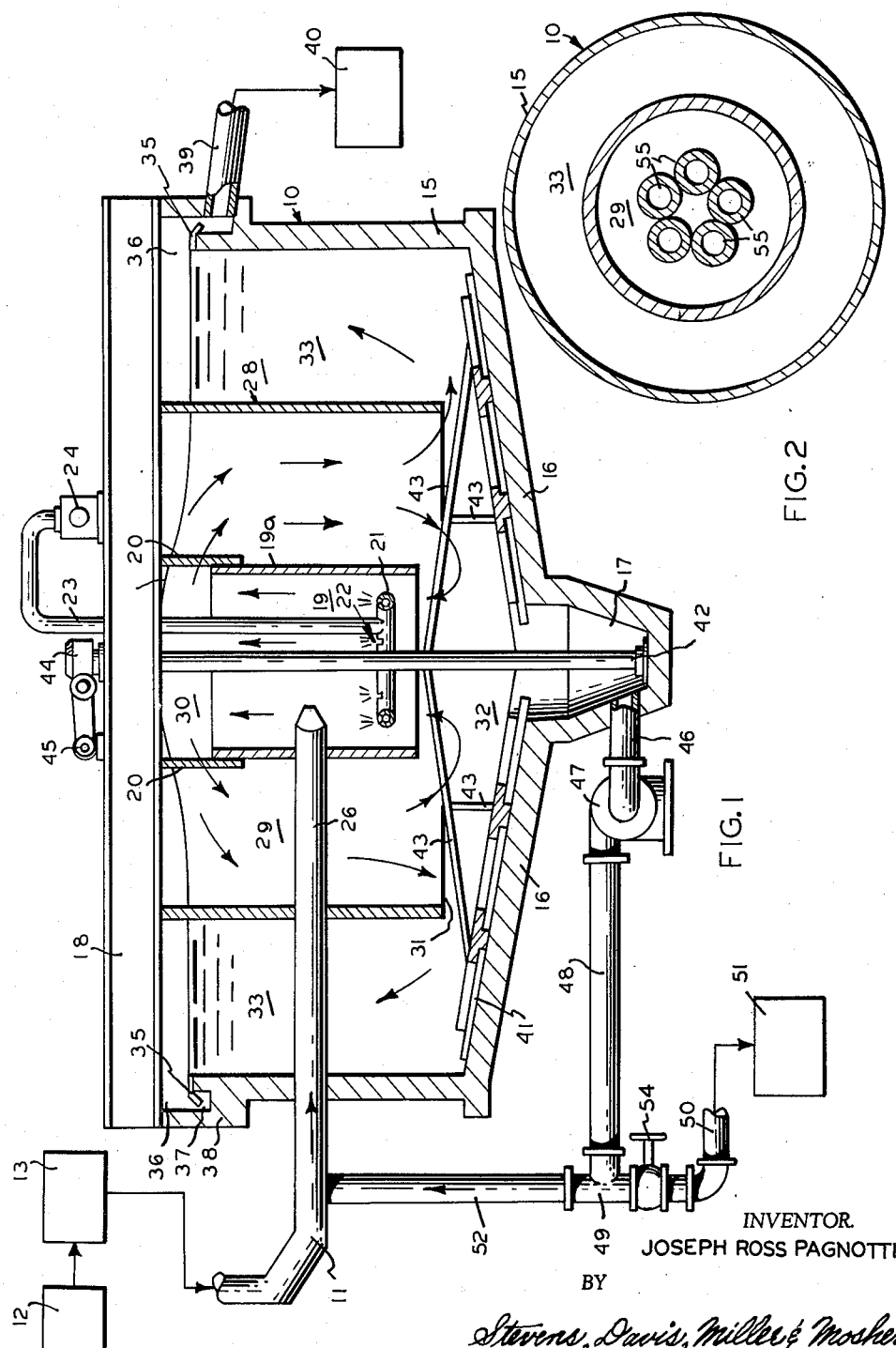

3,152,982
METHOD AND APPARATUS FOR
SEWAGE TREATMENT
Joseph Ross Pagnotti, 225 E. Morton St., Old Forge, Pa.
Filed Jan. 24, 1963, Ser. No. 253,601
8 Claims. (Cl. 210—7)

This invention relates to a novel method and apparatus for the treatment of sewage and other putrescible and waste liquors. More specifically, the invention relates to a continuous activated sludge process and apparatus whereby all constituents of the sewage are treated simultaneously in an aerobic environment in a single compact apparatus which results in a reduction in process time and a consequent reduction in size and cost of the plant required to process a given rate of inflow.

This invention is unique in that the products obtained from the sewage, the effluent and the waste sludge, are simultaneously produced under the same conditions in a single apparatus in an aerobic environment wherein the putrescible organic matter in all states, suspension, colloid, and solution, is rapidly absorbed and adsorbed and simultaneously biochemically oxidized to produce a purified effluent and a stabilized waste sludge.

The conventional sewage treatment plant utilizes a combination of three distinct processes:

(1) A clarifying process in which the settleable solids are removed as waste sludge;
(2) An activated sludge process in which the effluent from the first process is treated with bacterially active sludge to produce a purified effluent and a waste sludge; and
(3) A process for the treatment of the waste sludges from the above processes by anaerobic means.

The conventional activated sludge process consists of the agitation of a mixture of sewage and bacterially active sludge in minimal amount in the presence of ample atmospheric oxygen for a sufficient period of time to produce upon sedimentation a reasonably pure effluent and a bacterially active sludge, part of which is returned to the process. In this conventional sewage treatment process using activated sludge, a primary clarifier or sedimentation tank is provided for the removal of readily settleable solids. These solids are then passed to a huge digestor for anaerobic decomposition of the solids. This latter reaction is very slow, usually maintained at a somewhat elevated temperature and results in the production of a stabilized waste sludge and gases such as methane, carbon dioxide, and hydrogen sulfide, and a supernatant liquor which is returned to the process with the incoming raw sewage.

The effluent from the primary clarifier, which still contains colloidal matter and finely divided solids not readily settleable, is passed to an aeration unit where it is mixed with activated sludge returned from the secondary clarifier or sedimentation tank and aerated for a period of six to eight hours. This aerated mixed liquor is then passed to the secondary clarifier which produces a purified effluent and an activated sludge, 25% or 30% of which is returned to the aeration unit. The remainder of the activated sludge together with the readily settleable solids from the primary clarifier is passed to the digestor for anaerobic decomposition.

There are many modifications of this conventional activated sludge process, the common objectives being first, the prior removal of the maximum possible amount of solids for anaerobic treatment; second, the recirculation of a minimum quantity of bacterially active sludge; and third, the use of a minimum amount of air. The purpose of all these processes is merely the production of a purified effluent and the removal of all the solids. These solids, however, must be treated anaerobically before being sent to waste.

The conventional activated sludge process and many of its modifications have proven successful for the treatment of sewage in that an effluent can be produced that has a reduction in biochemical oxygen demand and suspended solids of about 95%. However, there are a number of disadvantages and many limitations:

(1) The time in process in present processes is excessive and results in the necessity for the construction of many large units of equipment.
(2) The waste sludge is treated anaerobically in huge usually heated digestors. This is a slow process and the supernatant liquor returned to the activated sludge process not only contains many times the biochemical oxygen demand content of the raw sewage, but due to its anaerobic condition is much more difficult to treat.
(3) Septicity often becomes evident on the floors of sedimentation and aeration units where the solids accumulate. These solids should be removed expeditiously, but the rate of removal of this sludge is limited by the volume that can be taken by the digestor which normally takes 60–80% of this material.
(4) Much time is required to create a quantity of bacterially active sludge sufficient to maintain the process and great care must be exercised to prevent septicity.
(5) The purity of the effluent is affected adversely by great variations in load.
(6) In order to prevent bulking, it is necessary to maintain very close control to balance the quantity and quality of the returned activated sludge and the quantity of air with variations in load.
(7) Other problems such as frothing and foaming arise frequently.

It is a general object of the present invention to provide a continous activated sludge process and apparatus for the treatment of sewage that is both efficient and economical and will eliminate the various difficulties and disadvantages and limitations encountered in the processes of treating sewage presently in use.

It is the principal object of the present invention to provide a continuous activated sludge process that is unique in that both products of the sewage, the effluent and the waste sludge, are simultaneously treated under the same conditions in a single apparatus in an aerobic environment wherein the putrescible organic matter in all phases and states, including suspension, colloid, and solution, is rapidly absorbed and adsorbed and simultaneously biochemically oxidized to produce a purified effluent and a stabilized waste sludge.

It is another object of the present invention to provide a sewage treatment process that treats raw sewage, without the preliminary removal of settleable solids, and by means of a unique aerobic environment, unlike all other processes, produces both a pure effluent and a stabilized waste sludge.

It is another object of the present invention to provide a sewage treatment process as above characterized which results in consistent and high biochemical oxygen demand and suspended solids reductions of the effluent and a stabilized waste sludge and which is not affected by wide variations in load.

It is another object of the present invention to provide a process for a more rapid and more consistent treatment of sewage.

It is another object of the present invention to provide a process that requires fewer steps and smaller equipment than that required by other processes.

It is another object of the present invention to provide a process that requires a minimum amount of control and is not subject to the many difficulties of other processes.

It is another object of the present invention to provide an apparatus for carrying out the process of the invention including a compact vessel or chamber having a centrally disposed aeration zone with means for introducing sewage and injecting air therein, an annular zone surrounding said central zone or chamber and in communication therewith to receive fluid from the aeration zone, a second annular chamber or zone surrounding the first and in communication therewith with weir means disposed adjacent the upper outer periphery of the second annular zone for collecting effluent therefrom, and means for removing deposited sludge and for recirculating same.

It is another object of the present invention to provide an apparatus as above mentioned further including scraper means located in the bottom of the apparatus for gathering the deposited sludge and delivering it to a sump.

It is another object of the present invention to provide a novel apparatus comprised of a single piece of equipment for carrying out a continuous activated sludge process which results in the production of a substantially purified effluent and a stabilized waste sludge.

The present invention comprises the rapid dissemination of raw sewage, stabilized sludge formed in the process, and atmospheric oxygen into a rapid upwardly moving stream of liquor containing activated sludge and its associated products; the upwardly flowing stream spills over its confines at its upper extremity and flows downwardly as a slowly moving stream, and then returns at its lower extremity to become again the aforementioned rapid upwardly moving stream producing a circulation of mixed liquor. The upward movement of the mixed liquor is turbulent and continuously receives additional raw sewage, stabilized sludge, and atmospheric oxygen; the downward movement of the mixed liquor is undisturbed flow, that is, the flow is straight line or viscous. A volume equivalent to the volume of incoming sewage is removed to a quiescent clarifying or sedimentation chamber, the effluent from which is the desired purified product. All of the stabilized sludge that settles to the bottom is continuously and expeditiously returned to the upwardly moving stream.

Various other objects and advantages of the present invention will be readily apparent from the following detailed description when considered in connection with the accompanying drawings forming a part thereof and in which;

FIG. 1 is a side elevation of the apparatus used in carrying out of the invention; and FIG. 2 is a modified form of the apparatus shown in FIG. 1.

Referring to the drawings, the reference numeral 10 generally designates a cylindrical treating vessel having an inlet or influent conduit or pipe 11 communicating therewith. The raw sewage which has been discharged from a sewage system is first passed through a bar screen member or apparatus 12 and thereafter is passed through a comminuting device 13 after which the body or mass of material enters the influent conduit 11 for treatment in the vessel 10. The raw sewage is first passed through the bar screen for the removal of large objects and then through the comminuting device for the shredding, breaking up and chopping of it into small discrete particles.

The cylindrical vessel 10 is provided with substantially vertical walls 15 and has a downwardly and inwardly inclined bottom 16 having its inner end lower than its outer end or portion. The bottom 16 does not extend completely across the bottom of the tank but is provided with a concentric and centrally disposed vertical cylindrical sump 17 therein which extends below the bottom for receiving sludge as hereinafter described. The top of the tank is open and is provided with a plurality of structural I beam members, one of which 18 is shown, to which the upper end of the walls 15 are bolted or secured by well-known means.

A cylindrical member 19a is concentrically disposed within the interior of the tank 10 along the vertical axis thereof and has its opposite ends spaced from the I beams 18 and the floor or bottom 16 of the tank so that the liquid mass may pass through the openings or passages formed between the I beams and the bottom of the tank. The cylindrical member 19a defines the aeration chamber or zone 19 of the apparatus and is hung or supported from the I beams 18 by a plurality of structural vertical straps or braces 20 circumferentially spaced therearound.

Air is supplied to the lower interior end of the cylindrical chamber 19 through a circular air distributor member 21 which consists of a horizontal ring having a plurality of openings or nozzles 22 in the top thereof. The ring 21 is supported by a vertical air supply pipe or tube 23 extending upwardly through the chamber 19 and above the I beams 18, and having its inlet end in communication with an air compressor 24 supported on the I beams. The inner end 26 of the influent pipe 11 extends through chamber 33 and into the lower end of the cylindrical member 19a and terminates to inject flow tangentially with respect to cylindrical member 19a above the ring 21.

A depending skirt member 28, having its upper end secured to the I beams 18, extends downwardly into the interior of the tank in spaced relationship with the sloping bottom 16 and below the lower end of the inner cylindrical member 19a. The cylindrical skirt member 28 is concentrically disposed about the cylindrical member 19a and completely surrounds it so as to form an annular chamber or zone 29 therearound. The chamber or zone 29 has an inlet end formed by the space 30 between the upper end of the inner cylindrical member 19a and the I beams 18 and two discharge openings, one adjacent its outer periphery indicated as 31 between its lower end and the sloping bottom 16, and the other outlet or discharge opening indicated as 32 adjacent the inner side of the chamber formed or provided by the sloping bottom 16 and the lower end of cylindrical member 19a.

Another outer annular chamber or zone 33 is formed between the inner surface of the wall 15 of the tank and the outer periphery of the cylindrical skirt member 28 which communicates with the annular chamber 29 through the opening 31 therebetween. The upper end of the chamber wall 15 is provided with an upwardly extending projection 35 in spaced relationship with the lower end or bottom of the I beams 18 to provide a discharge outlet 36 therebetween. The edge of 35 is below the upper end of the cylindrical skirt member 28 so that the mass can overflow 35 which provides a weir for discharging the effluent from the outer chamber 33. The upper end of wall 15 is provided with a launder 37 adjacent the weir 35 provided by the L-shaped section 38 formed in the upper end of the wall 15. The I beams 18 are bolted or secured by any well-known means to the upper end of the vertical leg of the L-shaped section 38. An effluent or discharge pipe 39 communicates with the launder or trough 37 so as to discharge purified effluent through a pipe to a chlorinator generally designated 40.

Disposed in the bottom of the tank 10 are a plurality of spaced scraper members 41. The members 41 are elongated arms radially disposed relative to the tank 10 and have their inner ends secured to a substantially vertical rotatable shaft 42 extending through the longitudinal or vertical axis of the cylindrical member 19a and tank 10. Struts 43 also serve to interconnect members 41 with shaft 42. The plurality of wiper or scraper members 41 scrape the bottom 16 of the tank to force the sludge therein downwardly into the sump 17. The bottom of the shaft 42 is disposed in the bottom of the sump 17 while the upper end of the shaft is supported by a bearing member 44 carried on the I beams and is rotatably driven by a geared motor 45 operatively connected thereto by belt means and also supported on the I beam structure.

The bottom of the sump 17 is provided with a discharge pipe 46 connected to the inlet or suction side of a centrifugal pump 47. The discharge side of the pump 47 is connected to a conduit or pipe 48 for removing the settled sludge from the sump. A T connection 49 is disposed in the outer end of the pipe 48. A valve 54 interconnects one leg of the T connection 49 with a pipe 50 which discharges into a drying bed 51. A recirculating pipe 52 interconnects the other leg of the T connection with the influent pipe 11.

In operation, raw sewage enters the influent line 11 and is discharged tangentially into the central lower portion of the aeration chamber or zone formed by the cylindrical member 19a.

Sufficient air, at a pressure sufficiently high to produce an airlift effect in this inner aeration zone is injected therein through the air nozzles 22 in the distributor ring 21. The injection of the air into the liquid mass composed of mixed liquor induces a rapid turbulent upward movement of the liquid mass and violently agitates it so that a rapid dissemination of the raw sewage, the stabilized sludge, the activated sludge, and the air takes place throughout the liquid mass, which mixing is thorough and practically instantaneous. The liquid mass rises as indicated in the direction illustrated by the arrows in the aeration chamber 19, rapidly rising therein and the mixed liquor overflows in a radially outwardly direction over the top of the cylindrical member 19a and thereafter, flows downwardly through the intermediate enveloping cylindrical zone or chamber 29. The injection of air causes the portion of the liquor adjacent the top of zone 19 to be at a higher level, as indicated at L in the drawings, than the upper liquid level in zones 29 and 33.

The flow in the intermediate zone 29 is relatively undisturbed, that is, straight line or viscous, and the downward movement of the mixed liquor is relatively slow therein. At the lower end of the chamber 29 the liquid stream moves radially inwardly through opening 32 to again become the rapid upwardly moving stream of the inner chamber 19. Thus, there is produced a continuously circulating stream containing activated sludge and its products in suspension.

Variations in the velocity of the upward movement can be obtained by varying the amount of air supplied and by changing the vertical level of the air distributor 21.

A portion of the circulating stream that is equivalent to the incoming raw sewage, is passed continuously and radially outwardly below the cylindrical skirt member 28 adjacent the outer side or portion of the chamber 29 and through the space 31 into the bottom of the outermost annular chamber 33, as indicated by the arrows in the drawings. The outer chamber 33 is maintained in a quiescent state. This zone 33 is the clarifying zone and it is characterized by a relatively long retention of the liquid mass therein. Here the sludge settles leaving the liquor above it clear and ready for discharge as the effluent. The effluent adjacent the upper end of the chamber 33 is substantially free of organic matter and flows over the weir 35 into the trough or launder 37 and is discharged through effluent conduit 39 to the chlorinator 40.

The solids that settle to the inwardly sloping bottom 16 are continuously and expeditiously gathered by the scraper members 41 resting on the bottom of the tank and discharged into the sump 17 through the continuous rotation of the scraper members 41 by shaft 42. The sludge that is deposited in the sump 17 is continuously withdrawn therefrom through the pipe 46 and the pump 47 and is returned through the recirculation line 52 to the influent line 11. The valve 54 is normally closed.

At relatively long intervals, for example 24 or 48 hours, the valve 54 is opened and a portion of the stabilized sludge is discharged to the drying bed 51. While the solids are beneficial to the process and are maintained in the process as long as possible, the accumulation of solids cannot be permitted indefinitely and provision is made for removal as described above, at such times as the amount of solids accumulates beyond the needs of the process.

In the process of the present invention, sufficient air is introduced into the mixed liquor in aeration chamber 19 to produce not only an upward movement of the liquid mass and an instantaneous and thorough mixing of the raw sewage, stabilized sludge, and mixed liquor containing activated sludge, but also to provide for the growth of an abundant population of bacteria and for the oxidation of the putrescible organic matter of the liquid mass in its downward path through intermedates chamber 29. The activated sludge in circulation is maintained in suspension continuously under optimum aerobic conditions and since there are no periods of insufficient oxygen, there can be no septicity, and close operational control is not necessary. Since bacteriological growth depends not only upon a plentiful supply of oxygen, but on a continuous supply of food which is the sewage, the continuous circulation is most favorable for the breeding and maintaining of great populations of aerobic bacteria and for the production of vast quantities of the products of bacteria, i.e., enzymes.

Due to the return of all of the stabilized sludge, the circulation through aeration zone 19 and intermediate chamber 29, and the thorough mixing of the activated sludge, the stabilized sludge, the raw sewage, and the oxygen; a unit volume of incoming sewage is dispersed through many volumes of mixed liquor and is exposed to high concentrations of solids characterized by vast contact surface area, highly active bacteria, and enormous quantities of enzymes by the bacteria.

The vast contact surface area exposed and generated in aeration chamber 19 by the high concentration of solids rapidly adsorbs the oxygen of the air. The surface area is also the repository for the vast quantity of enzymes formed in intermediate chamber 29. In the aeration zone in a matter of minutes, the oxygen of the air, the putrescible nitrogenous, carbonaceous, and other organic matter in all states of suspension, colloid, and solution are adsorbed and absorbed and passed on to the intermediate zone.

In the downward undisturbed flow of the intermediate zone 29 the bacteria has a high concentration of oxygen adsorbed and available and a plentiful supply of nitrogenous and other organic matter adsorbed and absorbed. In this environment, a rapid growth of bacteria takes place and accompanying it, is the formation of vast quantities of enzymes which catalyze the oxidation of the putrescible organic matter adsorbed and absorbed. This results in the rapid stabilization of the sludge.

In the continuous activated sludge process of the present invention, the environment is most favorable for the production of enormous quantities of enzymes, and the contact surface area is available upon which the catalytic oxidizing action of the enzymes can take place in the presence of adsorbed oxygen. It is for this reason that the liquid portion of the mixed liquor in the intermediate zone is practically purified.

Oxidation is completed in the clarification zone 33 and the sludge that settles in this zone is completely oxidized and stabilized. The high density of the stabilized sludge and the high concentration of solids provided by this process promotes rapid settling in this zone due to the agglomeration of the solids. The sludge is continuously removed from the bottom of this zone and returned to the process to provide a great quantity of solids and vast conact surface area, so necessary for the adsorptive phase of this process.

The quantity discharged as effluent from this zone 33 is roughly equivalent to the quantity of incoming sewage. The quantity of settled sludge together with mixed liquor removed from the sump at the bottom of the vessel and returned to the process is preferably equivalent to about 40% of the maximum load gallonage. However, this contains all of the deposited sludge, unlike other processes which return a minimum amount of sludge. It must be pointed out that whereas in other processes, it is necessary to remove the sludge in high concentration of solids because the greater portion of it is sent to the digestor for anaerobic decomposition, in the process of the present invention, it is permissible and often desirable to remove the sludge with a low concentration of solids. The return of all the sludge is of the utmost importance to the process because it makes available a vast surface area for adsorption and promotes settling in the clarification zone.

As evident from the above description of the operation of the process, three zones are provided, zones 19, 29 and 33. The environment in zone 19 is characterized by:

(1) Turbulent flow;
(2) A high concentration of solids which provides an enormous surface area;
(3) A supply of food in the form of raw sewage which includes domestic sewage, industrial waste, polluted waters, etc. containing suspended, colloidal, and dissolved putrescible matter consisting of nitrogenous and other organic matter;
(4) A high concentration of bacterially active sludge;
(5) A plentiful supply of oxygen to promote the growth of the bacteria; and
(6) An extremely high concentration of enzymes generated by the biological process of the bacteria, all in intimate contact and thoroughly disseminated throughout the mixed liquor. The putrescible matter of the sewage in suspension, colloid, and solution is rapidly absorbed and adsorbed by the sludge. The oxygen is adsorbed and held in high concentration on the surface of the solids.

The environment in zone 29 is characterized by:

(1) Relative undisturbed flow;
(2) A plentiful supply of oxygen both dissolved and adsorbed and held in high concentration on the solids surfaces;
(3) All the putrescible sewage matter absorbed and adsorbed by the activated sludge;
(4) Uniform dispersion;
(5) A high concentration of enzymes; and
(6) Intimate contact.

A rapid growth of the bacteria is here promoted, huge quantities of enzymes are generated, and the putrescible organic matter is oxidized producing a stabilized sludge. The oxidation of the organic matter is catalyzed by the enzymes and results in the production of a stabilized waste sludge.

Zone 33 is merely a clarifying or sedimentation tank characterized by a state of quiescence from which the clear purification liquor is discharged as effluent for further disposition such as chlorination, etc. and the stabilized solids that settle to the bottom are removed and returned to the process.

Referring to the embodiment of the invention disclosed in FIG. 2 this is substantially the same in structure and operation as that already described in connection with FIG. 1 except that the aeration chamber 55 consists of a plurality of chambers substantially the same as chamber 19 only disposed in an annular arrangement concentrically within the center of the tank or vessel.

Although the air distributor is shown as a ring 21, any other geometrical configurations can be used, the important consideration being to create a good air lift effect.

Although tank 10 is shown with a bottom that slopes inwardly, it is possible to construct the bottom to slope downwardly outwardly and collect the deposited sludge in a peripheral sump.

To more fully understand the significant results and advantages obtained by the present invention, a summary of test results and conditions of sewage treatment by way of example and for purposes of illustration is given hereinafter.

A vessel or tank such as that illustrated in the drawing was used for treating sewage which vessel had a depth of 10½ feet adjacent the wall 15 between the bottom and top of 35, with the center of the tank 12 feet in depth, chamber 19 was 7 feet in diameter, annular chamber 29 was 14 feet, outside diameter, and outer chamber 33 was 24 feet, outside diameter.

The detention time of the liquor or stream in each zone was as follows, the reference numerals given being the same as those in the drawings:

| Detention Time | Zone | Diameter, feet |
| --- | --- | --- |
| 15 minutes | Aeration or turbulent zone 19 | 7 |
| 45 minutes | Undisturbed flow zone 29 | 14 |
| 120 minutes | Clarifying zone 33 | 24 |

In the above table, it should be understood that due to the rapid circulation through zones 19 and 29, the detention times of 15 minutes and 45 minutes are total accumulated times and may be the result of many passes through the two zones.

The maximum inflow of raw sewage through line 11 was a maximum of 200 gal./min. and the minimum inflow was 90 gal./min. with a recirculation of sludge through line 52 of 75 gal./min. during these tests.

It was found that the B.O.D., i.e., biochemical oxygen demand of the influent during this period and for these conditions was a minimum of 102 p.p.m. and a maximum of 410 p.p.m. with an average of 225 p.p.m.

The suspended solids, S.S., of the influent during this period under these conditions was a minimum of 106 p.p.m. and a maximum of 395 p.p.m. with an average of 183 p.p.m.

The effluent discharged through line 39 had a minimum B.O.D. of 3 p.p.m. and a maximum of 32 p.p.m. with an average of 14 p.p.m., and a suspended solids, S.S., minimum of 7 p.p.m. and a maximum of 46 p.p.m. with an average of 20 p.p.m.

The percent reduction of B.O.D. ranged from a minimum of 83.7% to a maximum of 97.2% with an average of 93.7%, the S.S. percent reduction had a minimum of 70.1% and a maximum of 92.3% with an average of 89.2%.

These test results were obtained over a three month period from the operations of a municipal sewage system with several hundred readings taken usually hourly or at half hour intervals.

In most of the conventional processes and in the many modifications of them, the volume of air required varies not only with the sewage load, but also with a number of other factors. The air requirement is usually stated in cubic feet of air per gallon of raw sewage inflow.

In the conventional process, the volume of air required is a function of the B.O.D. of the effluent from the primary clarifier. The solids removed in the primary clarifier are decomposed anaerobically and only the supernatant liquor from the digestor is returned to the aerobic portion of the process. By this procedure, probably 30% of the putrescible matter as measured by the B.O.D. is removed from the aerobic portion of the process.

In the process embodied in the present invention, all of the raw sewage is treated aerobically since no preliminary removal of the settleable solids is made.

Moreover, in the process of this invention, the air is utilized also for purposes other than the biochemical requirement, namely to maintain the mixed liquor in circulation and for agitation and the rapid dissemination of all the constituents.

Therefore, in the present invention the volume of air is always in excess of that of the biochemical requirement. In tests, it has been found that the required volume of air is determined by the velocity of circulation necessary for optimum results. It will be apparent from the example cited above that unlike all other processes, the volume of air used is constant and independent of the quantity of raw sewage inflow.

Notwithstanding the use of air for purposes other than the biochemical requirement, the volume of air compares very favorably with that required in the conventional processes which is about 1.00 cubic foot per gallon of raw sewage inflow. In the example cited, with air furnished at the constant rate of 150 cubic feet per minute, the volume of air per gallon of raw sewage inflow is:

1.67 cu. ft./gal. at the minimum flow of 90 gal./min.
0.75 cu. ft./gal. at the maximum flow of 200 gal./min.
1.014 cu. ft./gal. at the estimated average flow of 148 gal./min.

The reasons for the lower air requirement for the purely biochemical phase are the unique environment which produces an extremely rapid oxidation process and the short period of only one hour for aeration and circulation as opposed to six to eight hours for aeration in the conventional process.

It will be realized that many modifications and variations of the present invention are possible in the light of the above teachings. It is therefore to be understood that within the scope of the appended claims the invention may be practiced otherwise than as specifically described.

What is claimed is:

1. A method of treating sewage and other putrescible waste liquors to produce simultaneously and in the same aerobic environment a purified effluent and a stablized waste comprising:
   (a) establishing an aeration zone, a treatment zone, and a clarification and sedimentation zone with the tops and bottoms of said aeration and treatment zones in communication and the bottoms of said treatment and clarification and sedimentation zones in communication,
   (b) filling said zones with liquid to a predetermined static level,
   (c) introducing sewage into said aeration zone to form a mixed liquor with the liquid therein containing solids in suspension,
   (d) injecting air directly upwardly into the aeration zone in excess of the maximum biochemical oxygen demand of the process and in sufficient quantity to thoroughly mix the liquor and to raise the level of liquid in the aeration zone above said static level and to produce a rapid and continuous circulation of mixed liquor containing activated sludge and stabilized sludge solids in suspension up through the aeration zone, into and down through the treatment zone and back into the aeration zone, the flow in the aeration zone being rapid and turbulent and the flow in the treatment zone being relatively slower and relatively undisturbed providing the environment for the absorptive and adsorptive processes and for the rapid growth in population of robust aerobic bacteria,
   (e) removing liquid as a purified effluent from the clarification and sedimentation zone upon introduction of sewage into the aeration zone whereby an equivalent portion of liquid in the bottom of the treatment zone passes into the clarification and sedimentation zone wherein the liquid is in a quiescent state and all the suspended stabilized sludge solids settle to the bottom,
   (f) collecting all the settled stabilized sludge solids and returning all the collected stabilized sludge solids to the aeration zone whereupon the stabilized sludge solids become part of the mixed liquor, whereby the circulating mixed liquor contains a high concentration of stabilized sludge solids in suspension furnishing a vast surface area upon which is adsorbed oxygen, putrescible matter, and baceteria and, as a result of the catalytic effect of enzymes produced by the bacteria, the oxidation of the sewage proceeds rapidly, and
   (g) removing at relatively long intervals a portion of the collected stabilized sludge solids as stabilized waste to relieve the build up of solids beyond the needs of the process.

2. The method of claim 1 wherein said aeration and treatment zones are concentrically arranged.

3. The method of claim 1 wherein said aeration, treatment, and clarification and sedimentation zones are concentrically arranged.

4. The method of claim 1 wherein the sewage is introduced into the lower portion of the aeration zones.

5. Apparatus for treating sewage and other putrescible waste liquors to produce simultaneously in the same aerobic environment a purified effluent and a stabilized waste comprising:
   (a) means defining an aeration zone, a treatment zone and a clarification and sedimentation zone with the tops and bottoms of said aeration and treatment zones in communication and the bottoms of said treatment and clarification and sedimentation zones in communication,
   (b) liquid filling said zones to a predetermined static level,
   (c) means for introducing sewage into said aeration zone to form a mixed liquor with the liquid therein containing solids in suspension,
   (d) means for injecting air directed upwardly into the aeration zone in excess of the maximum biochemical oxygen demand of the mixed liquor therein and in sufficient quantity to thoroughly mix the liquor and to raise the level of liquid in the aeration zone above said static level and to produce a rapid and continuous circulation of mixed liquor containing activated sludge and stabilized sludge solids in suspension up through the aeration zone, into and down through the treatment zone and back into the aeration zone, the flow in the aeration zone being rapid and turbulent and the flow in the treatment zone being relatively undisturbed providing the environment for the adsorptive and absorptive processes and for the rapid growth in population of robust aerobic bacteria,
   (e) means for removing liquid as a purified effluent from the clarification and sedimentation zone upon introduction of sewage into the aeration zone whereby an equivalent portion of liquid in the bottom of the treatment zone passes into the clarification and sedimentation zone wherein the liquid is in a quiescent state and all the suspended stabilized sludge solids settle to the bottom,
   (f) means for collecting all the settled stabilized sludge solids and returning all the collected stabilized sludge solids to the aeration zone whereupon the stabilized sludge solids become part of the mixed liquor, whereby the circulating mixed liquor contains a high concentration of stabilized sludge solids in suspension furnishing a vast surface area upon which is adsorbed oxygen, putrescible matter, and bacteria and as a result of the catalytic effect of enzymes produced by the bacteria the oxidation of the sewage proceeds rapidly, and
   (g) means for removing at relatively long intervals a portion of the collected stabilized sludge solids as stabilized waste to relieve the build up of solids beyond the needs of the process.

6. Apparatus according to claim 5 wherein said aeration and treatment zones are defined by concentrically arranged wall members.

7. Apparatus according to claim 5 wherein said aeration, treatment, and clarification and sedimentation zones are defined by concentrically arranged wall members.

8. Apparatus according to claim 5 wherein said aeration and treatment zones are concentrically arranged and said aeration zone is defined by a plurality of cylindrical wall members into each of which air is injected.

References Cited in the file of this patent

UNITED STATES PATENTS

| | | |
|---|---|---|
| 1,310,051 | Blomfield | July 15, 1919 |
| 2,429,316 | Green | Oct. 21, 1947 |
| 2,492,486 | Kivari et al. | Dec. 27, 1949 |
| 2,647,869 | Kelly | Aug. 4, 1953 |
| 2,678,915 | Kalinske | May 18, 1954 |
| 3,043,433 | Singer | July 10, 1962 |

OTHER REFERENCES

Kalinske et al.: New Equipment for the Activated Sludge Process, Water and Sewage Works, July 1956, vol. 103, pp. 324–329.

Infilco, The Aero-Accelator, Bulletin 6510-D, 1957, a publication of Infilco, Inc., Tucson, Ariz., 15 pp.

Eckenfelder: Pilot Plant Investigations of Biological Sludge Treatment etc., Proc. 7th Ind. Waste Conf., Purdue Univ., 1952, pp. 181–188.

Infilco, the Biosorption Activated Sludge Plant, Bulletin 6550-A, 1956, a publication of Infilco, Inc., Tucson, Ariz., 8 pp.

Infilco, The Cyclator Clarifier, Bulletin 850-C, 1956, a publication of Infilco, Inc., Tucson, Ariz., 12 pp.

Tapleshay: Total Oxidation of Organic Wastes, Sewage and Industrial Wastes, vol 30, May 1958, pp. 652–661.